(12) United States Patent
Bach et al.

(10) Patent No.: US 11,248,672 B2
(45) Date of Patent: Feb. 15, 2022

(54) DRUM BRAKE WHICH CAN BE OPERATED BY AN ELECTRIC MOTOR

(71) Applicant: Continental Teves AG & Co. oHG, Frankfurt (DE)

(72) Inventors: Uwe Bach, Niedernhausen (DE); Jens Hoffmann, Darmstadt (DE); Niclas Görrissen, Frankfurt (DE); Wolfgang Ritter, Oberursel/Ts. (DE); Ahmed Sefo, Frankfurt (DE); Holger von Hayn, Bad Vilbel (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 3 days.

(21) Appl. No.: 14/895,299

(22) PCT Filed: Jun. 3, 2014

(86) PCT No.: PCT/EP2014/061514
§ 371 (c)(1),
(2) Date: Dec. 2, 2015

(87) PCT Pub. No.: WO2014/195329
PCT Pub. Date: Dec. 11, 2014

(65) Prior Publication Data
US 2016/0102720 A1 Apr. 14, 2016

(30) Foreign Application Priority Data
Jun. 6, 2013 (DE) ...................... 10 2013 210 528.2

(51) Int. Cl.
*F16D 65/16* (2006.01)
*F16D 65/22* (2006.01)
(Continued)

(52) U.S. Cl.
CPC .............. *F16D 65/22* (2013.01); *B60T 7/085* (2013.01); *B60T 7/102* (2013.01); *F16D 51/00* (2013.01);
(Continued)

(58) Field of Classification Search
CPC .......... F16D 51/12; F16D 51/10; F16D 51/16; F16D 51/18; F16D 51/20; F16D 51/22;
(Continued)

(56) References Cited

U.S. PATENT DOCUMENTS 1,926,374 A 9/1933 Dodge
2,163,879 A 6/1939 House
(Continued)

FOREIGN PATENT DOCUMENTS

DE 3018296 A1 11/1981
DE 4035237 A1 5/1992
(Continued)

OTHER PUBLICATIONS

German Search Report for German Application No. 10 2013 210 528.2 dated Jan. 31, 2014, including partial translation.
(Continued)

*Primary Examiner* — Bradley T King
*Assistant Examiner* — Stephen M Bowes
(74) *Attorney, Agent, or Firm* — RatnerPrestia

(57) ABSTRACT

A drum brake module for motor vehicles, the drum brake module being driven by an electric motor and having at least one parking brake function, includes an electromechanical cable pull actuator which is fastened on the anchor plate with the aid of an adapter. The adapter is designed as a one-piece, thin walled frame having at least one fastening flange for receiving the cable pull actuator and is held in place on the anchor plate.

14 Claims, 12 Drawing Sheets

(51) Int. Cl.
*F16D 51/00* (2006.01)
*B60T 7/08* (2006.01)
*B60T 7/10* (2006.01)
*F16D 51/28* (2006.01)
*F16D 121/24* (2012.01)
*F16D 125/60* (2012.01)

(52) U.S. Cl.
CPC .......... *F16D 51/28* (2013.01); *F16D 2121/24* (2013.01); *F16D 2125/60* (2013.01)

(58) Field of Classification Search
CPC .......... F16D 51/46; F16D 51/48; F16D 51/50; F16D 51/60; F16D 51/62; F16D 2125/40; F16D 2125/582; F16D 2051/003; F16D 65/12; F16D 2121/14; F16D 2121/24; F16D 2125/60; F16D 2125/62; F16D 65/22
IPC ....................................................... F16D 65/30
See application file for complete search history.

(56) References Cited

U.S. PATENT DOCUMENTS

| | | | |
|---|---|---|---|
| 2,404,054 A | 7/1946 | Goepfrich | |
| 3,575,266 A * | 4/1971 | Sitchin | F16D 51/20 188/106 A |
| 4,147,239 A * | 4/1979 | Kluger | F16D 65/565 188/79.56 |
| 4,955,458 A * | 9/1990 | Shellhause | F16C 1/12 188/106 A |
| 6,464,046 B1 * | 10/2002 | De Vecchi | F16C 1/12 188/326 |
| 6,506,838 B1 | 1/2003 | Seyama | |
| 6,705,439 B1 | 3/2004 | Wang | |
| 9,175,737 B2 | 11/2015 | Bach | |
| 2003/0075001 A1 | 4/2003 | Petrak | |

FOREIGN PATENT DOCUMENTS

| | | |
|---|---|---|
| DE | 19826785 | 12/1999 |
| DE | 102012201579 | 8/2012 |
| EP | 0402660 | 12/1990 |
| EP | 0594233 | 12/1995 |
| EP | 0920390 | 11/2003 |
| JP | 2002310207 A | 10/2002 |
| WO | 2012104395 | 8/2012 |

OTHER PUBLICATIONS

International Search Report for International Application No. PCT/EP2014/061514 dated Sep. 11, 2014.
Non Final Office Action for U.S. Appl. No. 15/647,440, dated Feb. 6, 2019, 22 pages.
Final Office Action for U.S. Appl. No. 15/647,440, dated Jun. 25, 2019—20 pages.
Korean Notice of Grounds for Rejection for Korean Application 10-2015-7036997, dated Jun. 19, 2020, with translation, 14 pages.
Decision to Grant a Patent for Korean Application No. 10-2015-7036997, dated Dec. 21, 2020 with translation, 3 pages.

* cited by examiner

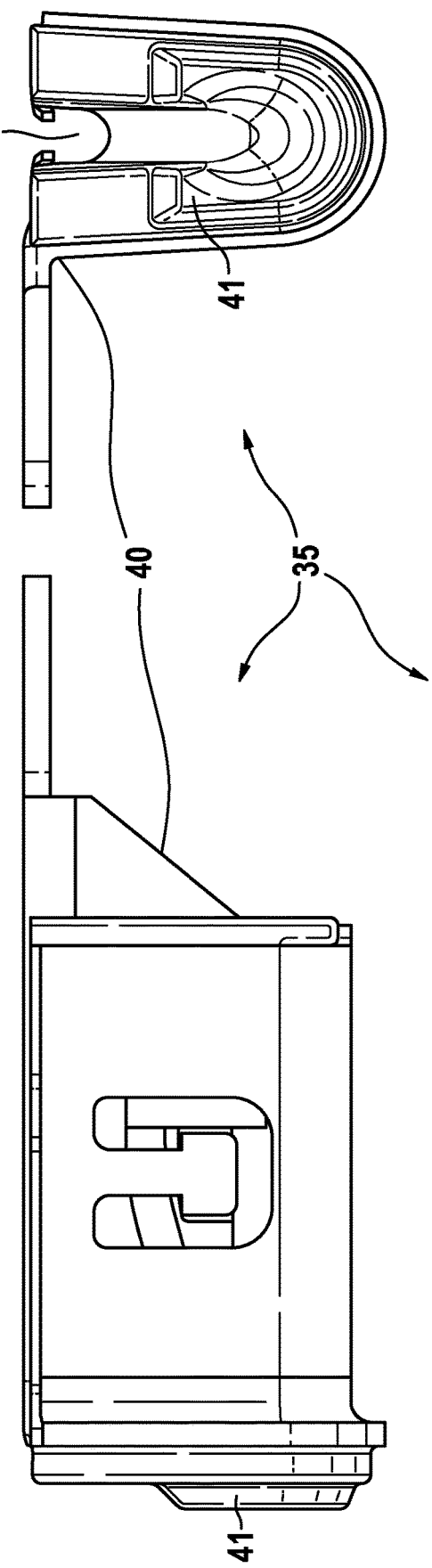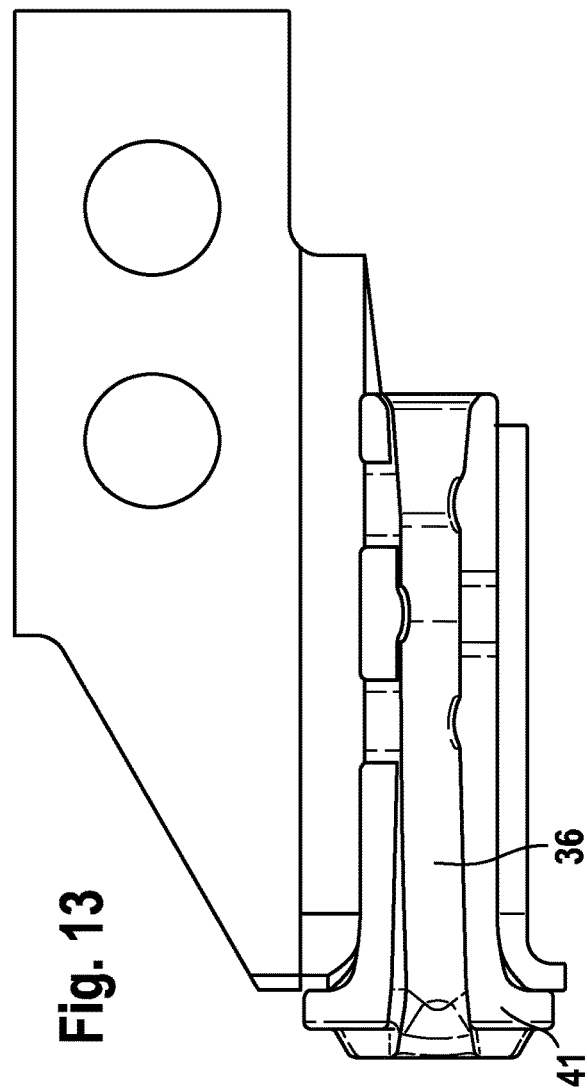

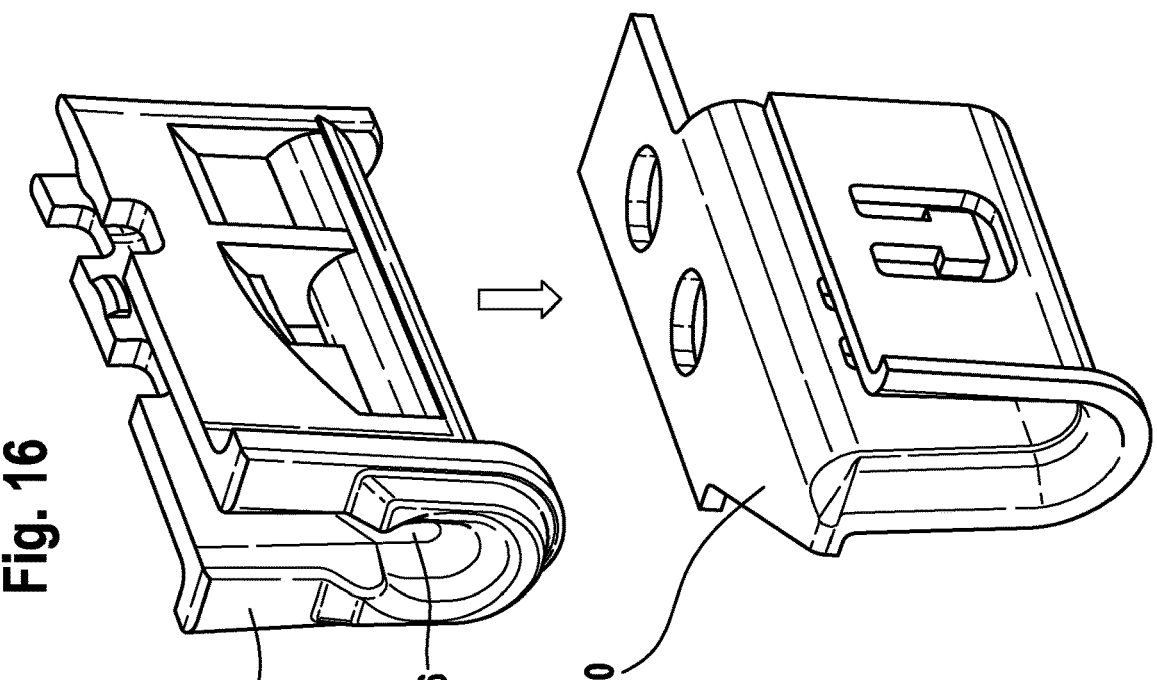
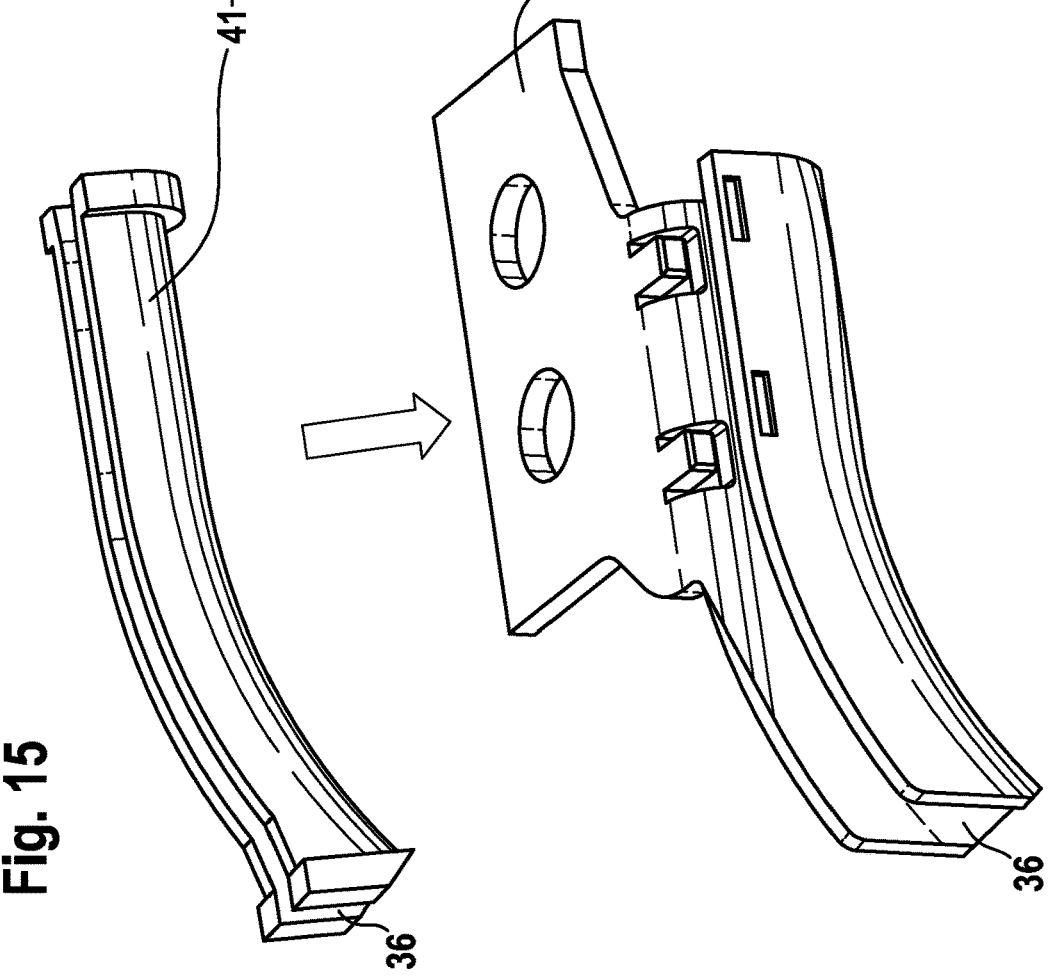

DRUM BRAKE WHICH CAN BE OPERATED BY AN ELECTRIC MOTOR

CROSS REFERENCE TO RELATED APPLICATIONS

This application is the U.S. National Phase Application of PCT International Application No. PCT/EP2014/061514, filed Jun. 3, 2014, which claims priority to German Patent Application No. 10 2013 210 528.2, filed Jun. 6, 2013, the contents of such application being incorporated by reference herein.

FIELD OF THE INVENTION

The present invention relates to an electrically actuated drum brake, in particular electromotively actuated drum brake module, with improved cable pull actuator arrangement for motor vehicles, comprising an electromechanical cable pull actuator which is arranged on an outer side of the anchor plate and which serves for driving a rotation-translation converter for converting a rotational drive input rotary movement into a translational actuation movement (B) of brake pads, which brake pads are arranged on an inner side, averted from the cable pull actuator, of the anchor plate in the interior of a brake drum, such that said brake pads can perform an actuation movement in the direction of the brake drum, and wherein an adapter is arranged between cable pull actuator and anchor plate.

BACKGROUND OF THE INVENTION

A drum brake may in principle be designed in a variety of ways in accordance with different construction principles (simplex, duplex, duo-duplex, servo, duo-servo). A uniform advantage of drum brakes in terms of construction is the self-boosting effect thereof in at least one direction of rotation, such that in principle, it would be possible to dispense with a brake force booster.

To realize an electromechanical parking brake function, it is normally the case that, in addition to conventional hydraulic wheel brake actuation elements of a service brake, a central electromechanical cable pull actuator is provided which has an electric motor and a speed-reduction gearing and a threaded nut-spindle arrangement which, via a relatively long cable pull, acts on at least one brake pad of a drum brake. In this way, an electromechanical parking brake (EPB) is realized which is universally suitable for small and lightweight vehicles but also for heavy vehicles if little installation space for the arrangement of a cable pull actuator exists in the region of the wheel brake.

To realize the parking brake function, electromechanically actuable parking brakes with an axially displaceable (floating) expansion lock arranged in a guide are also known. The expansion lock has two actuation elements which are displaceable in translatory fashion and which act on the brake pads in opposite directions. In each case one gearwheel mechanism with a speed reduction function is provided in integrated fashion in the cable pull actuator, such that the expansion lock acts directly on the brake pads.

The known electromechanically actuable drum brake immobilization systems each have room for improvement with regard to the outlay for the construction thereof and the space requirement thereof. Parking brake cable pull systems with a central cable pull actuator are disadvantageous because, at a vehicle manufacturer, separate installation and articulation of the cable pull on the wheel brake is necessary, such that the final installation of cable pull actuator, cable pull and wheel brake can only be performed on the assembly line at the vehicle manufacturer, which increases the complexity of manufacture in that area. For mass production, vehicle manufacturers basically seek particularly efficient, flexible, modularly adaptable vehicle production with the least possible complexity of manufacture. Furthermore, it is sought to expand the functional scope of a parking brake to include a service brake function.

Therefore, EP 0 920 390 B1, which is incorporated by reference has disclosed an electromechanically actuable drum brake module with a particularly small overall structural size. Here, an outer circumference of a cylindrical actuation unit is inserted through an opening of an anchor plate. A rotatable drive nut is supported, via the motor housing, on a carrier plate. To shorten the structural length of the actuation unit, it is provided that a rotor of a specially designed electric motor engages radially around the outside of a spindle arrangement, and guides said spindle arrangement in a rotationally fixed manner. This type of construction requires an electric motor designed to be of relatively high power, which electric motor has a special housing and a specially adapted carrier plate.

An electromechanically actuable duo-servo drum brake without cable pull articulation is known from EP 594 233 B1, which is incorporated by reference. Here, an electric motor is arranged on a rear side of an anchor plate. The motor axis is therefore always arranged at right angles to an axis of rotation of a brake drum, and drives a threaded spindle which is positioned in a rotatable and axially non-displaceable manner. The threaded spindle is provided, parallel to the motor axis, in the brake drum, and is mounted in a housing. The threaded spindle is in engagement with an element which is mounted in axially displaceable and non-rotatable fashion in the housing, which element acts on a lever mechanism. This type of construction requires not only an electric motor which is dimensioned to be of relatively high power but also further very specifically designed components, and therefore does not permit simple variation in the context of mass production. Problems arise in the event of hot shutdown.

SUMMARY OF THE INVENTION

In the case of the previously known systems, different vehicle requirements and differently exploitable installation conditions in the different motor vehicle models necessitate highly individual adaptations to a wide variety of components of the drum brake module. An aspect of the present invention therefore proposes solutions which permit particularly simple and efficient adaptation of a drum brake module to the various different motor vehicle applications in conjunction with particularly high efficiency.

To solve the problem, it is proposed that a drum brake module be provided which has an anchor plate and an adapter for the fixing of a cable pull actuator, wherein it is furthermore provided that the adapter is in the form of a separate and thin-walled frame with at least one fastening flange for accommodating the cable pull actuator, and wherein the fastening flange has a passage for the cable pull. The adapter designed in this way permits an identical-parts strategy in the production of actuator housings, by virtue of the housing of the wheel brake actuators installed on the right-hand side as viewed in the direction of travel being of identical design to the wheel brake actuators installed on the left-hand side as viewed in the direction of travel. The frame type of construction of the adapter according to the invention furthermore makes it possible to realize a highly efficient, stiff and thus loss-free modular construction, because, owing to the cable pull actuator support according to the invention, undesired elasticities and friction losses of the cable pull actuator are eliminated.

In a preferred embodiment of the invention, the frame has, at the cable pull actuator side, a planar fastening flange which, depending on the installation conditions, can be easily arranged in skewed fashion in relation to the anchor plate without the need to modify an actuator housing, wherein the fastening flange is integrally equipped with multiple struts arranged at an angle and obliquely with respect to one another. The fastening flange, which can basically be arranged in arbitrarily skewed fashion, makes it possible for the available installation space for the arrangement of the cable pull actuator to be utilized optimally. Here, it is possible for thin struts to be combined in the manner of a framework or to alternatively be in the form of planar supporting walls which are connected in each case to one another and/or to the fastening flange by way of flexurally stiff junctions. Supporting walls which are closed in the manner of wall panels have the advantage that a particularly robust and protected interface and cable pull leadthrough between actuator and anchor plate is realized. The supporting walls may however also be equipped with cutouts in order to permit a weight saving. To stiffen the frame, the junctions that are formed may additionally be stiffened by way of ribs. For the introduction of force, and for the support of the struts or supporting walls, these terminate, at the anchor plate, substantially parallel to an outer side of the anchor plate and with multiple support areas which, in the case of a particularly lightweight construction, make it possible to realize simple, defined, buckling-resistant and also stable support. This is particularly preferably statically determinate support by way of three or more struts or supporting walls arranged obliquely in space. Furthermore, it is preferably possible for the supporting walls or struts to be arranged at an angle, in particular in pyramidal or tetrahedral fashion, with respect to one another so as to form a regular or irregular polyhedron. Owing to the introduction of force being split up in this way, a particularly efficient introduction of force between the cable pull actuator and the anchor plate is made possible. In a preferred embodiment, the adapter is provided in the form of a unipartite sheet-metal deformed part or of a unipartite, heat-resistant plastics part.

To improve the adaptation to different installation conditions while at the same time maintaining a constant efficiency of the drum brake module over the service life, the cable pull actuator is assigned a cable pull guide body with a curved cable receptacle and with a U-shaped cross section. Said cable pull guide body may, as a separate component, be inserted, on an inner side of the carrier plate, into a positively locking receptacle so as to be forced into the receptacle by acting cable pull forces. The cable pull guidance function can be additionally improved by way of walls (U limbs) which are of raised form in the manner of a channel. The cable pull guide channel thus formed may be formed so as to be narrowed in funnel-shaped fashion proceeding from a cable inlet. The U limbs of the cable pull guide channel may furthermore be equipped with cams which at least partially engage over the cable so as to prevent an undesired escape of a slack cable, in particular in a released state of the brake. The cams may be provided, with an axial spacing to one another, in each case on opposite U limbs. The cable pull guide body may be of single-part or multi-part form. For example, the multi-part variant makes it possible for a holding component to be equipped with a cable pull guide channel component which has expedient friction characteristics. The single-part or multi-part cable pull guide body is finally fastened, by fastening means, to the anchor plate. For this purpose, on the cable pull guide body, there is preferably provided at least one detent means which comprises at least one elastic spring leg which engages elastically on a recess or on a cam of the anchor plate. The cable pull guide body may have incorporated solid lubricant constituents, and may preferably be composed of a plastics material that is resistant to high temperatures. Perpendicular to the cable axis, there may be provided one or more holding arms which are welded or riveted non-detachably, and directly or indirectly together with the support device, to the anchor plate.

BRIEF DESCRIPTION OF THE DRAWINGS

The drawing shows various views, partially schematic and partially on different scales, in different sections, in different views or in different perspectives, in which:

FIG. 4, FIGS. 7-11 show a first design variant of a preferred cable pull guide body in different views, FIGS. 12-15 show a second design variant of a cable pull guide body, FIG. 16 shows a third variant of a cable pull guide body.

DETAILED DESCRIPTION OF THE PREFERRED EMBODIMENTS

Figure 1:
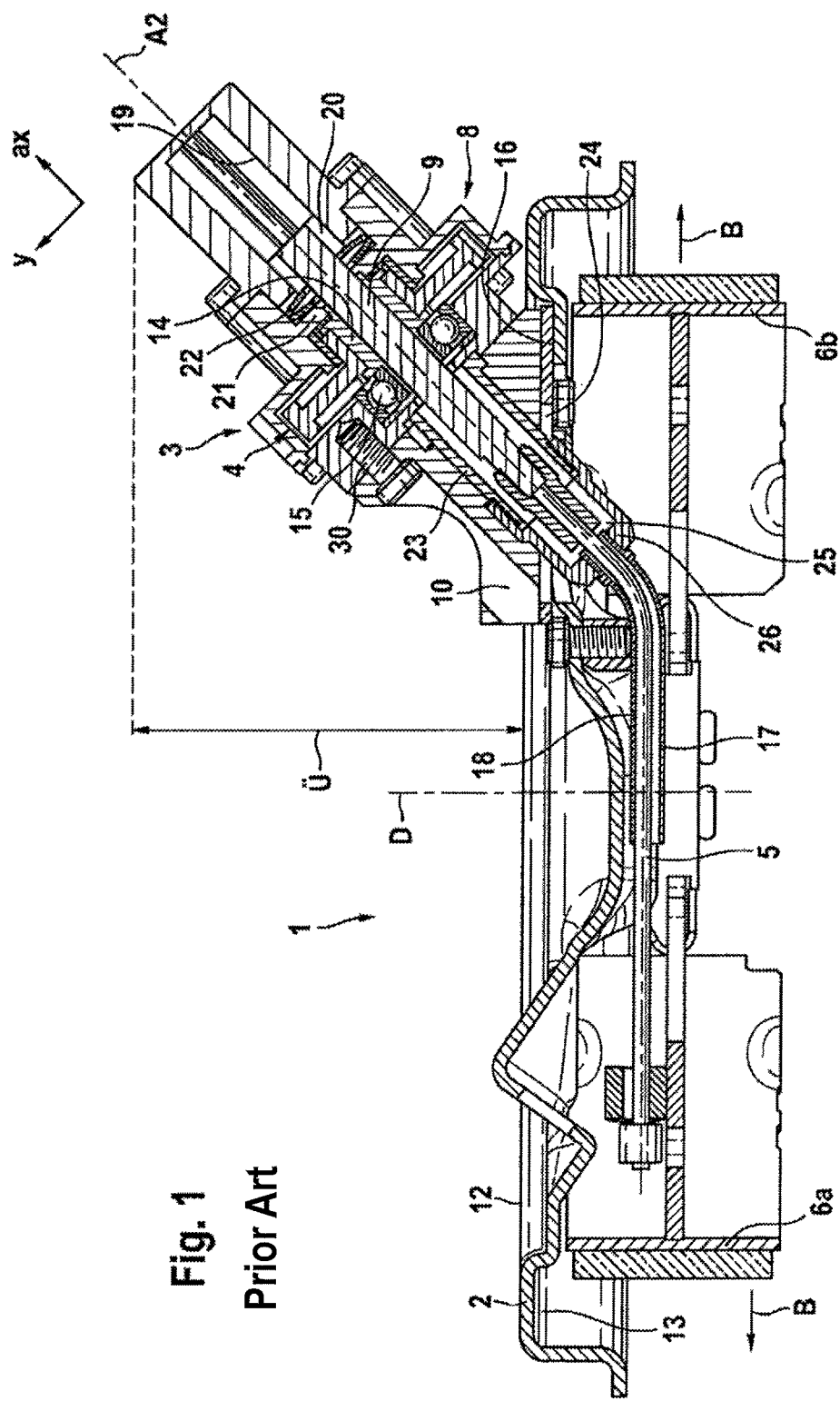
FIG. 1 shows, for explanatory purposes, a previously published drum brake module with anchor plate and cable pull actuator, but without brake drum, in section, as per WO 2012/104395 A2, which is incorporated by reference.
Figure 2:
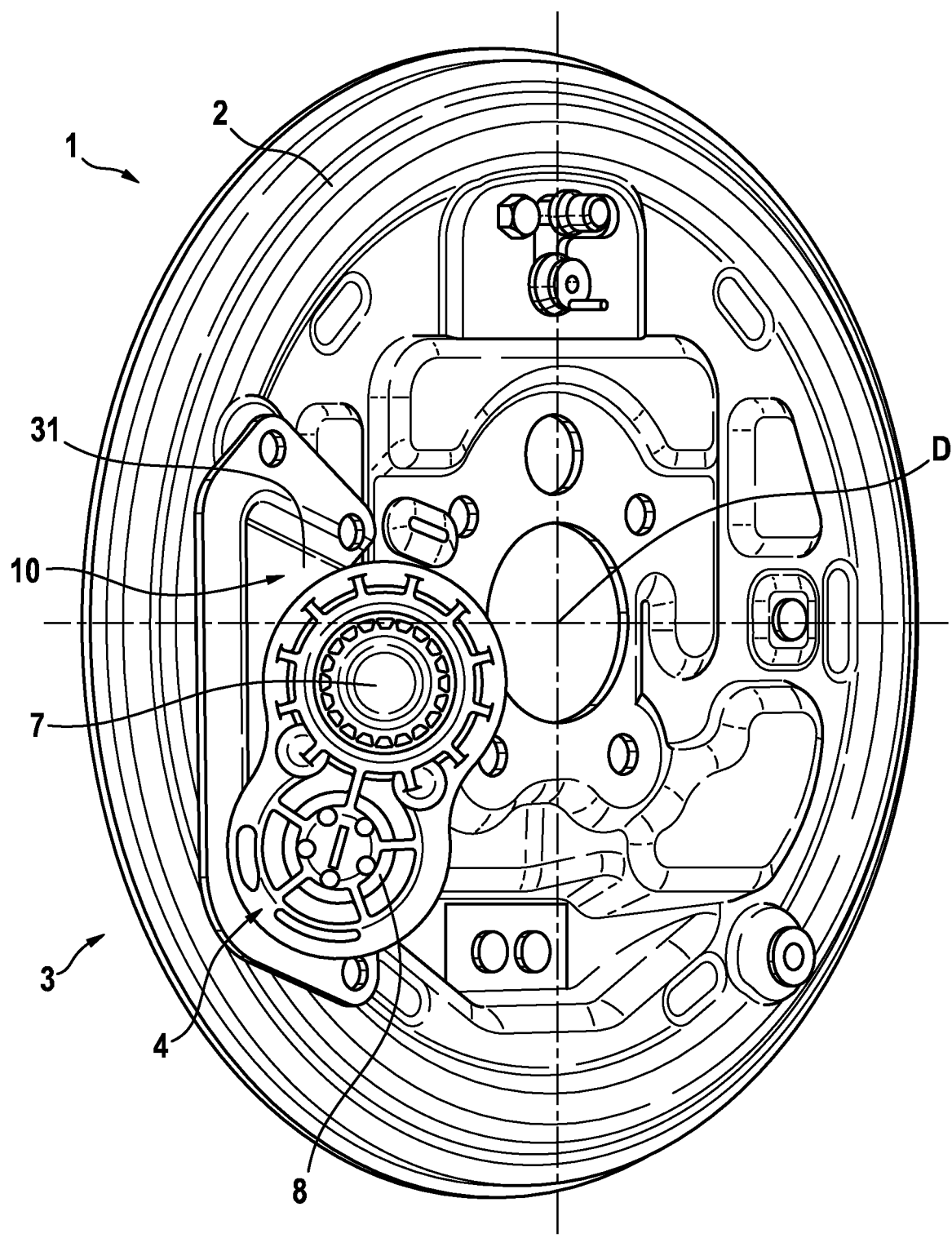
FIG. 2 shows a perspective view of a drum brake module according to the invention for use on a right-hand side of a vehicle, without a brake drum, viewed from a rear side of the anchor plate.
Figure 3:
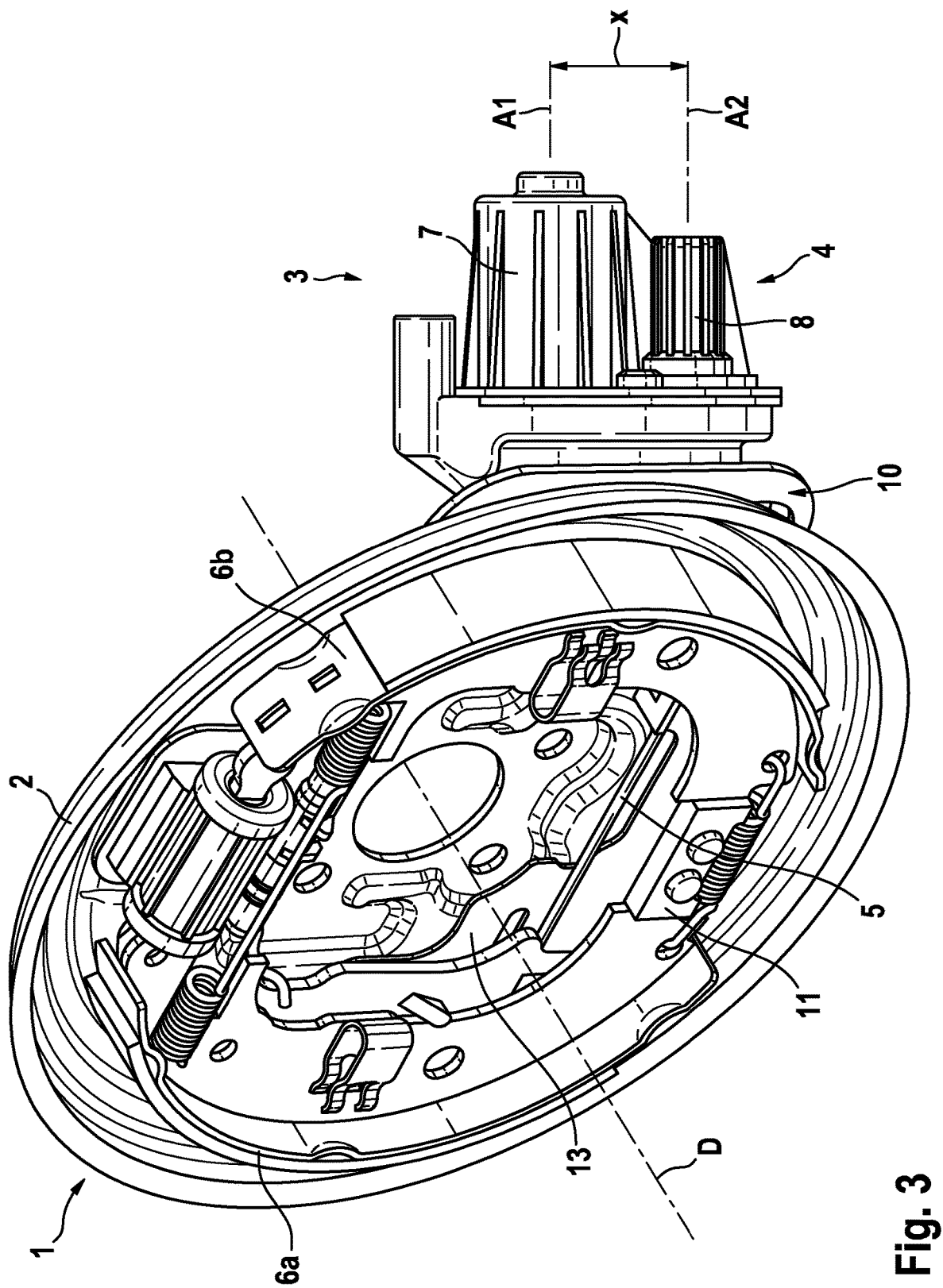
FIG. 3 shows a view similar to FIG. 2, viewed from a front side of the anchor plate.
Figure 4:
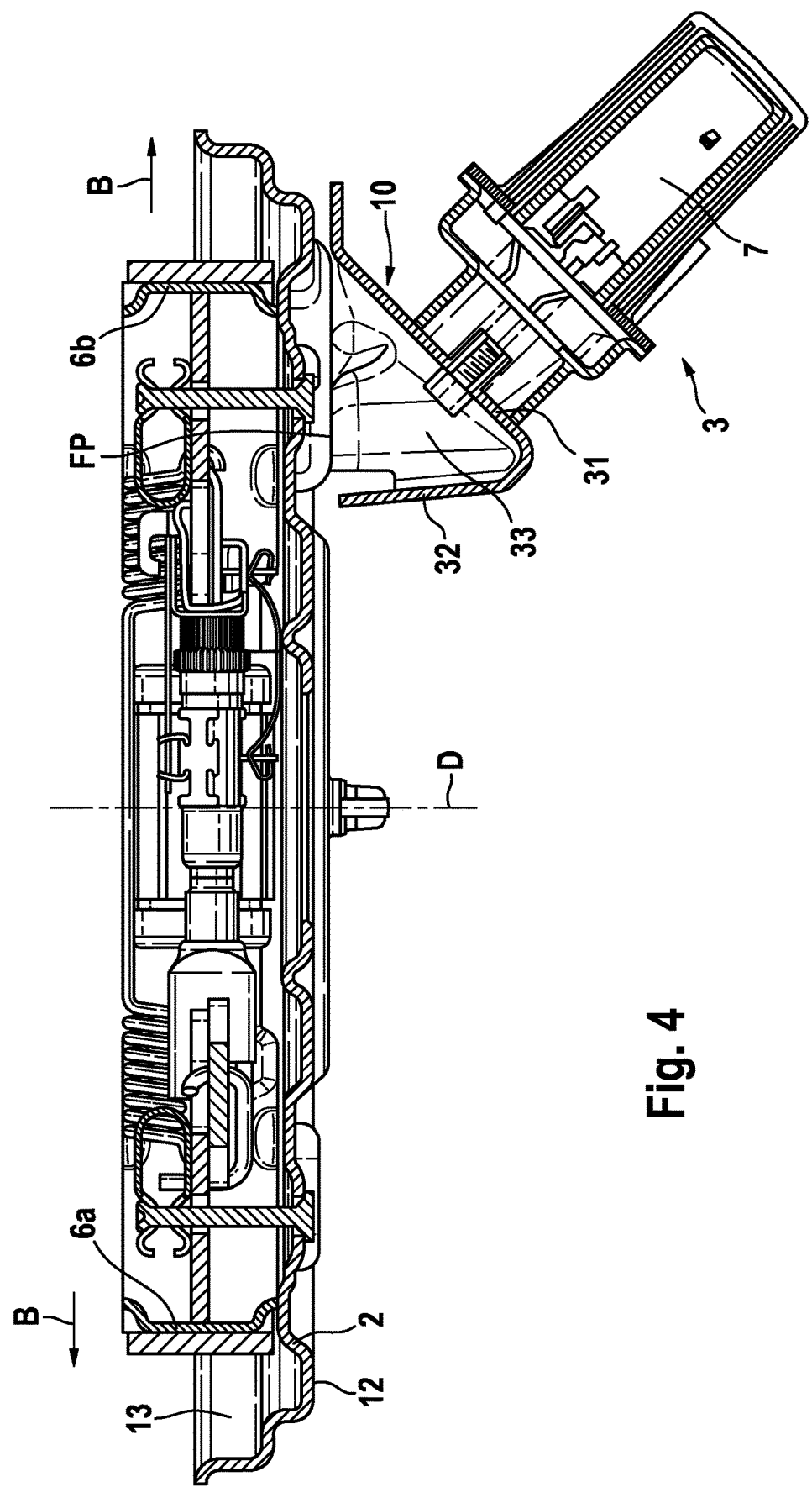
FIGS. 4 and 6 show two selected sections through a drum brake module according to the invention.
Figure 5:
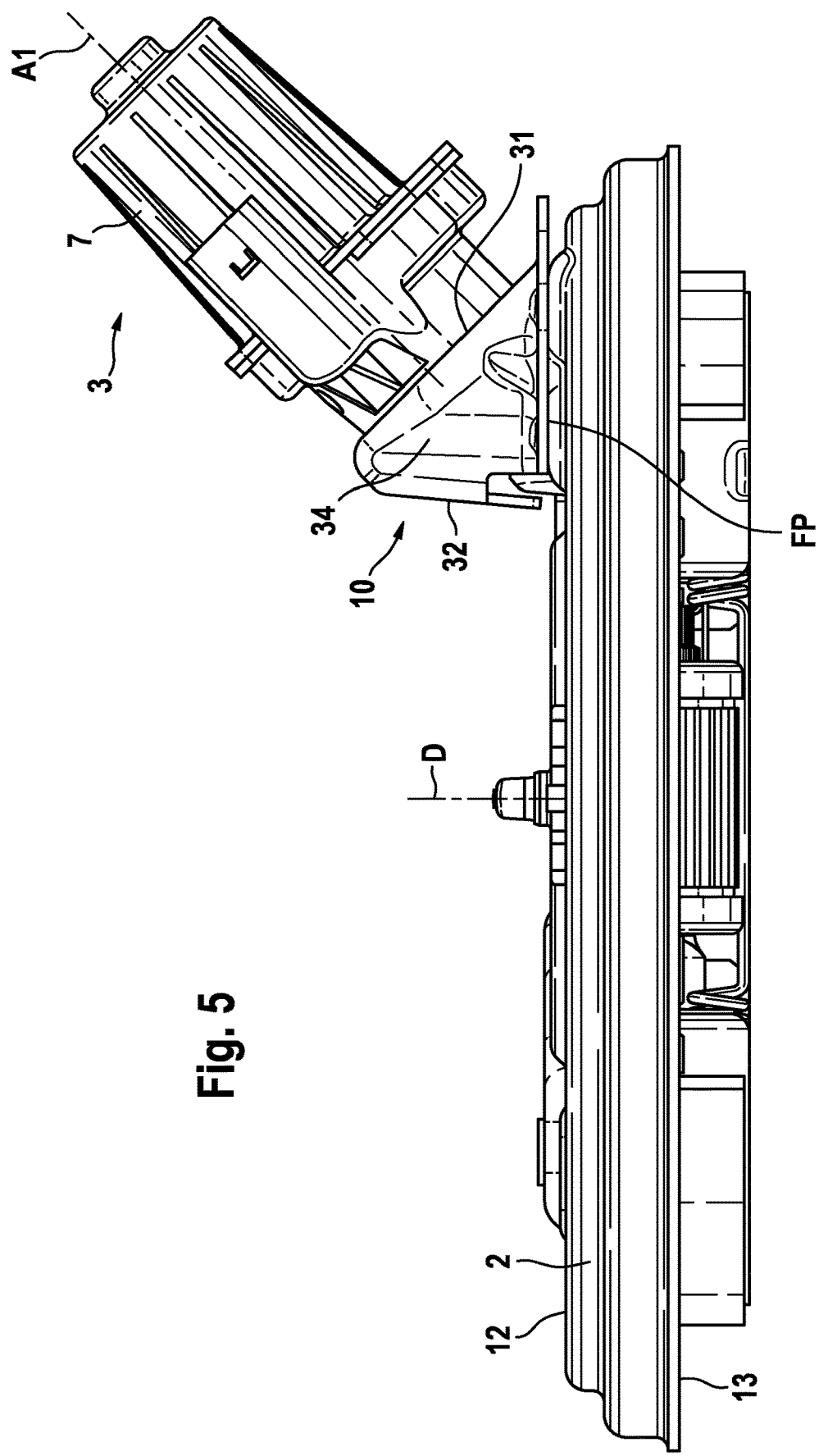
FIG. 5 shows a side view of the drum brake module as per
Figure 6:
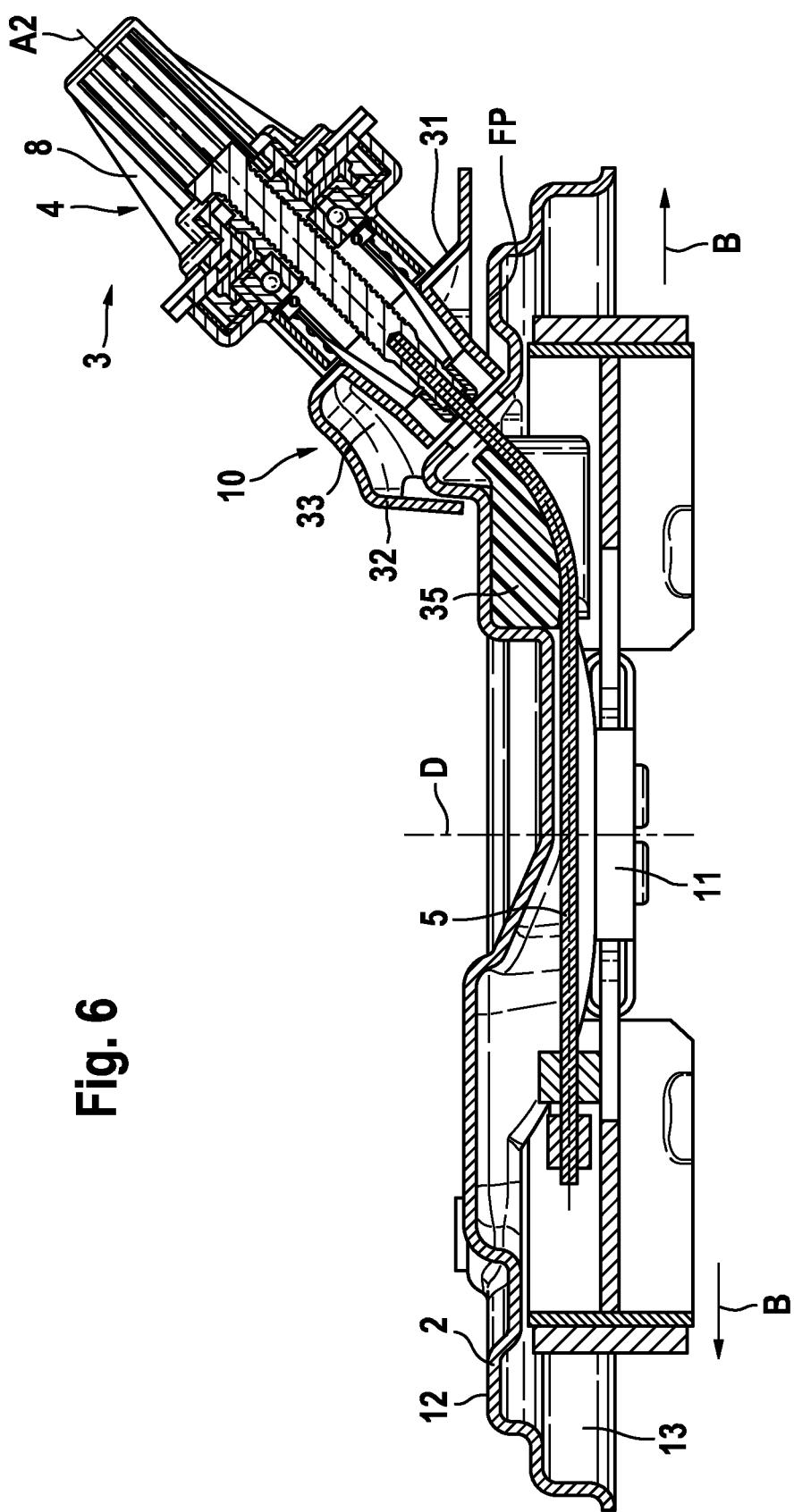
Figure 7:
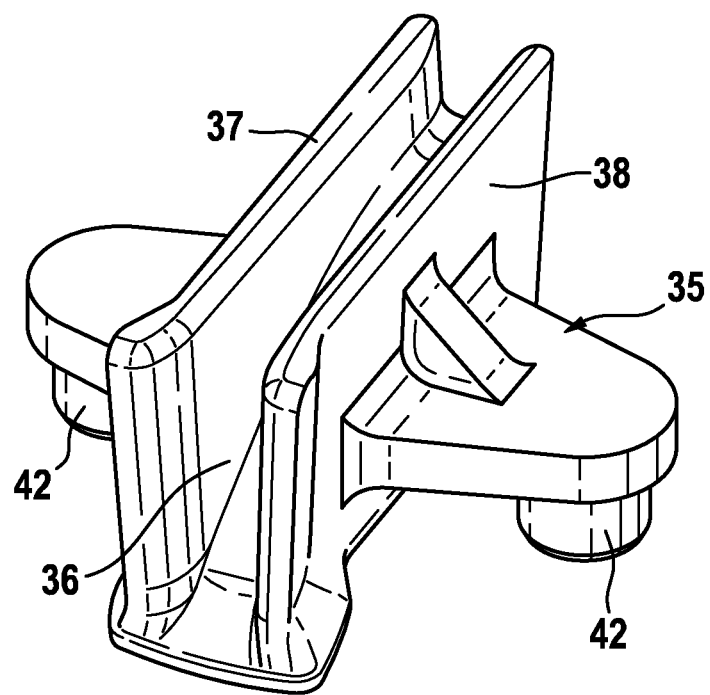
Figure 8:
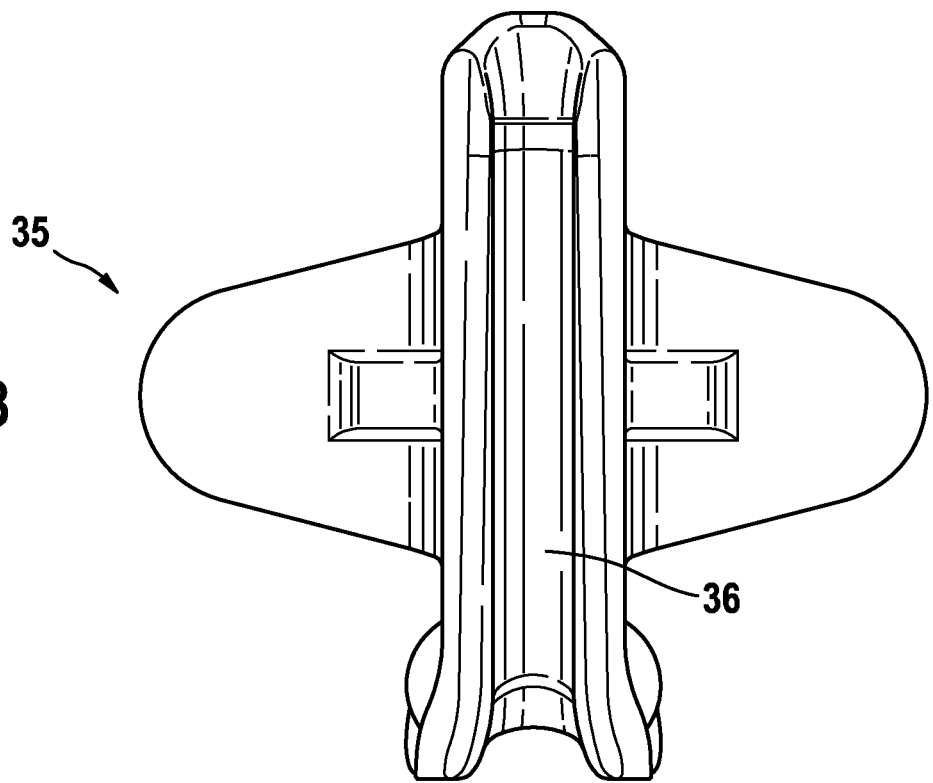
Figure 9:
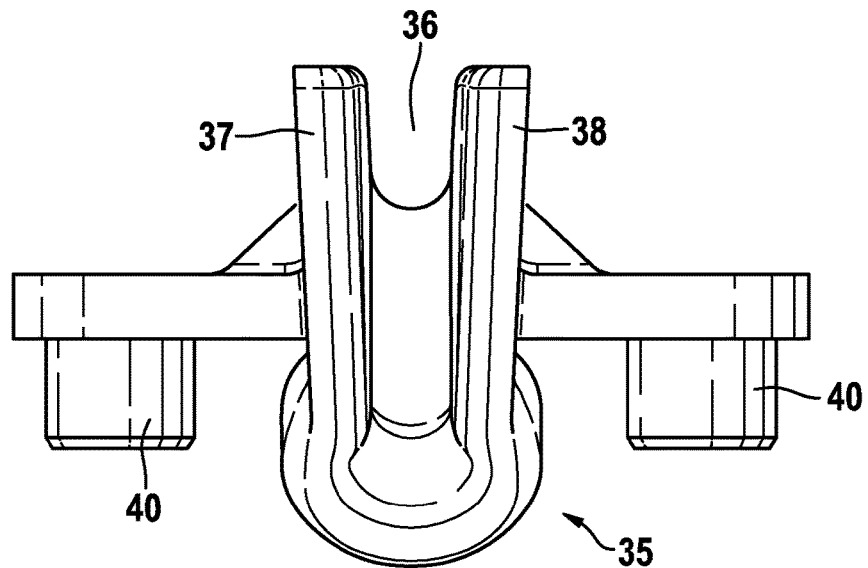
Figure 10:
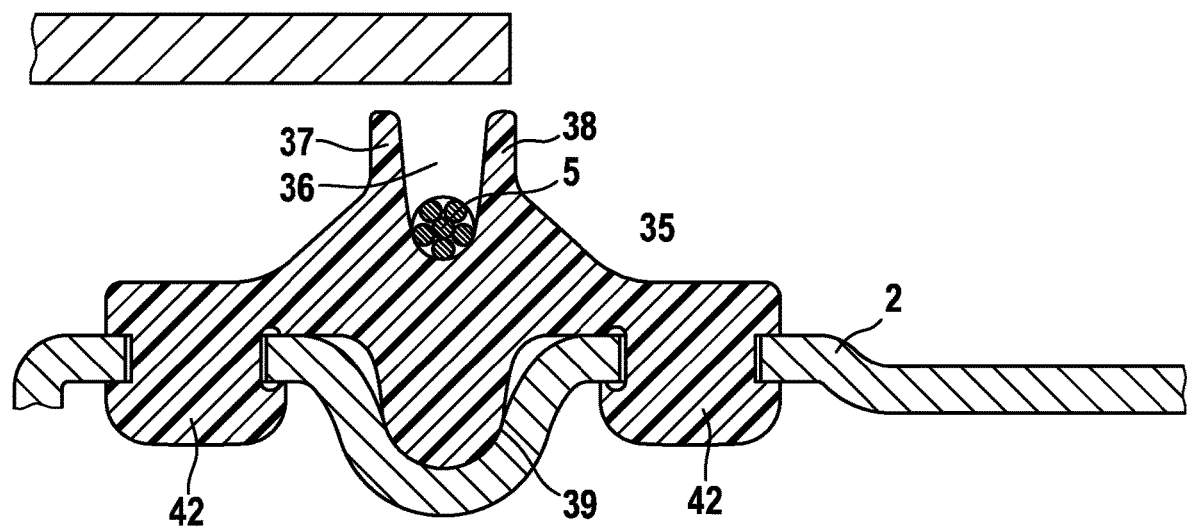
Figure 11:
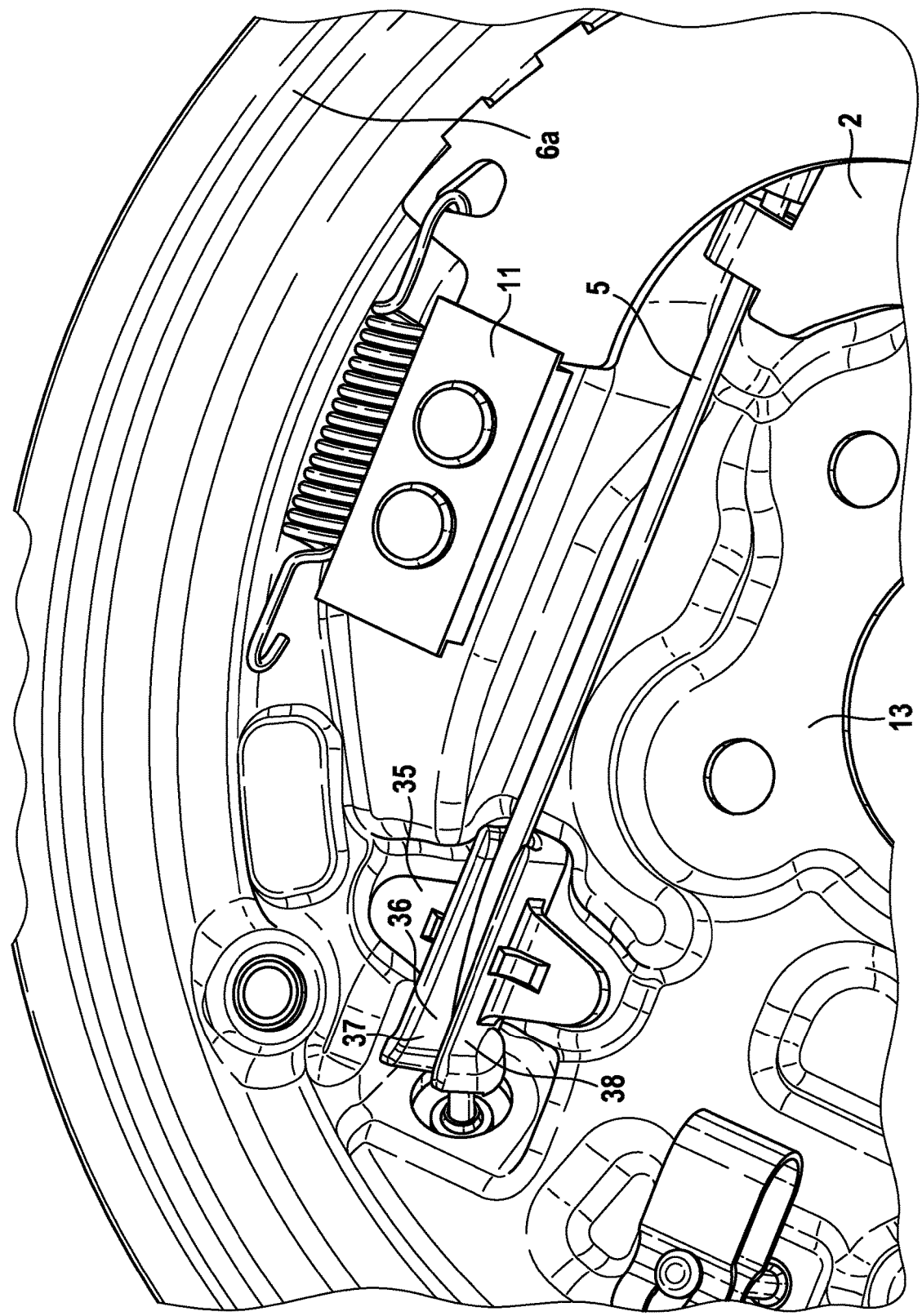

A known electromotively actuable drum brake module 1 for arrangement on axle components of a motor vehicle comprises, as per FIG. 1, an anchor plate 2 with brake pads 6a,b mounted thereon, which brake pads are provided within a brake drum (not shown). Fastened to an opposite side of the anchor plate 2 is an electromotively driven cable pull actuator 3 which, by way of a gearing 4 and a cable pull 5 connected downstream, engages on one or more of the brake pads 6a,b such that said brake pad(s) 6a,b can perform an actuation movement B in the direction toward the brake drum in order to realize a service brake and/or parking brake function. A support device 11 may be provided between the brake pads 6a,b.

The gearing 4 comprises a gearing housing 8 which accommodates or at least bears the motor 7. The motor 7 consumes direct-current voltage, is mechanically or electronically commutated, and is of a standard type that is available at low cost.

FIG. 1 illustrates, at best indirectly, that an axis A1 of the motor 7 is arranged parallel, and with a spacing x, to an axis A2 of a spindle arrangement 9. The adapter 10 is incorporated between cable pull actuator 3 and anchor plate 2.

The drive and gearing train has a multi-stage, in particular two-stage, gearwheel and/or belt and/or worm mechanism and/or planetary gear set (mixed combinations of the above-mentioned types are possible and desirable) as a speed-reduction torque converter. Here, a preferably two-stage gearwheel mechanism permits a speed reduction ratio in a range between approximately 7:1 and 25:1. If the lever mechanism connected downstream in the region of the brake pads 6a,b permits a speed reduction ratio of approximately 5:1, a speed reduction ratio of approximately 125:1 is realized. Furthermore, an additional speed reduction action is realized by the rotation-translation converter, thus permitting an overall speed reduction action, over the entire drive train, of an order of magnitude of at least approximately 250:1. By means of this gearing train, the costs of and power demands on the motor 7 are additionally considerably reduced.

The cable pull actuator construction can be seen in detail from FIG. 1. The cable pull actuator 3 is in this case provided, as a separately handlable structural unit, on one side 12 of the anchor plate 2. It is possible for the rotation-translation converter to be integrated, as a spindle arrangement 9, into the gearing housing 8 and to be guided in rotationally fixed, free-moving and play-free manner in the gearing housing 8. A modification of the design consists in the rotation-translation converter being provided outside the gearing housing 8 and within the brake drum and comprising a spindle arrangement 9 or a pivotable lever which is mounted on the anchor plate 2. The fastening is preferably in the form of a detachable flange mounting.

As can be seen, in part, from FIG. 1, the gearing housing 8 is of multi-part construction. The gearing housing 8 accommodates a multiplicity of gearing components which serve primarily for torque conversion (low input torque, high output torque) and which can also permit a deenergized-state parking brake function by way of self-locking. The axes A1, A2 of the motor and gearing shafts are provided parallel to one another so as to be offset by the spacing X. At least certain gearing components may at least partially have inexpensive plastics material. The deenergized-state self-locking is preferably provided in the rotation-translation converter (spindle arrangement 9), such that the rest of the gearing train is in principle substantially relieved of the brake-application forces.

As per FIG. 1, the gearing housing 8 at least partially additionally accommodates a rotation-translation converter assembly with the spindle arrangement 9 for the conversion of the rotational drive input rotary movement into a translational drive output movement. Consequently, the converter is, for space-saving integration into the known drum brake arrangements, incorporated in inexpensive and space-saving (concentrated) fashion in an interface between cable pull actuator 3 and anchor plate 2, and is nevertheless guided in the gearing housing such that, for retrofitting of the electromechanical cable pull actuator arrangement, no modifications whatsoever have to be made to the drum brake mechanism, in particular to the lever mechanism or to the anchor plate 2.

For applications with a particularly effective, friction-reduced electromechanical brake function, multiple rolling bodies are situated between a drive nut 14, which is in principle of metallic form, and a spindle arrangement 9, which is in principle of metallic form. In the case of the variants which are "released when deenergized", a parking brake function is made possible by way of a separate immobilizing, locking or blocking device. A particularly advantageous device is known for example from DE 19826785 A1, which is incorporated by reference, the content of disclosure of which, with regard to the principles of said immobilizing device, is incorporated in full here.

The force flow of the brake actuation force is as follows: proceeding from brake pad 6a,b and cable pull 5, the tensile force passes via spindle arrangement 9 into the drive nut 14. For direct, rigid support of the braking force on a planar contact surface 16, a metallic spacer bushing may be provided. The latter supports an outer ring of the bearing 15 on the anchor plate 2. The spacer bushing is preferably formed, as an insert part, into the gearing housing 8 composed of plastics material. The bearing 15 is advantageously designed as a low-friction rolling bearing (angular-contact bearing, shoulder bearing, axial bearing or deep-groove ball bearing). The described bearing 15 also permits a radially directed mounting for the drive nut 14. In a modification of the design, for particularly precise, tilting-resistant support of the drive nut 14, in each case one drive input-side and additionally one drive output-side bearing may be provided, without departing from the scope of the invention.

The spindle arrangement 9 is in engagement with the drive nut 14 and is positioned in the gearing housing 8 in a rotationally fixed and axially displaceably guided manner. For this purpose, the gearing housing 8 has a prismatic or cylindrical guide 19 with at least one or more matching slotted-guide elements which, as positively acting means, contribute to the guidance and rotation prevention function. To permit expedient electrical deactivation of the cable pull actuator 3, the spindle arrangement 9 is equipped with a stop 20 which serves for abutment against a counterbearing 21 on the housing. Furthermore, at least one elastic element 22 is provided between the counterbearing 21 and stop 20. The elastic element 22 is preferably in the form of a disk spring arrangement which makes it possible to realize a stiff spring characteristic curve with a small space requirement. This, in conjunction with measurement and monitoring of the current demand of the motor 7, permits expedient and early automatic electrical deactivation by way of the control unit. To permit constantly reproducible deactivation, the system requires operating conditions which are as constant as possible (cable guide friction).

The concentrated cable pull actuator design includes the spindle arrangement 9 being at least partially accommodated, in displaceably guided fashion, in a connector 23 of the gearing housing 8. The connector 23 is arranged centrally in relation to a passage opening 24 of the anchor plate 2. The connector 23 preferably extends through the passage opening 24 such that at least a part of the spindle arrangement 9 can be displaced into the interior of the brake drum. This also serves for automatic centering of the cable pull 5.

This being assumed, the special features of drum brake modules having the adapters 10 according to an aspect of the invention will be discussed below. The purpose of this novel adaptation is primarily an identical-parts strategy with regard to the components of the drum brake module, such as in particular anchor plate 2 and gearing housing 8, for all vehicle applications. In other words, according to the invention, it is made possible for all cable pull actuators 3 for arrangement on a right-hand brake side of a vehicle and for arrangement on a left-hand brake side of a vehicle to in each case be of structurally identical form, wherein in each case substantially only the adapter 10 is of varying, vehicle-dependent design in accordance with the respectively provided interface, the installation space, the anchor plate 2 and the side of the vehicle. As a result, according to the invention, simple adaptation to different space and installation conditions in a motor vehicle is made possible for the first time.

It is provided according to an aspect of the invention that the adapter 10 is provided in the form of a unipartite and thin-walled frame which, on one side, has at least one planar, thin fastening flange 31 for accommodating the cable pull actuator 3, wherein the frame is fixed at the other side to the anchor plate 2. In this way, a particularly lightweight and stable framework structure is realized which can be adapted inexpensively with relatively manageable outlay and tool usage. Here, the frame is advantageously provided in unipartite form with multiple thin struts 32, 33, 34 which are arranged at an angle and obliquely with respect to one another and which extend between the fastening flange 31 and anchor plate 2. The struts 32, 33, 34 consequently bear the fastening flange 31. The length and angular position of the struts 32, 33, 34 is freely variable such that the fastening flange 31—and consequently the axes A1, A2 of the cable pull actuator 3—can assume any desired angular position in relation to the anchor plate 2. The thin struts 32, 33, 34 may be in the form of flexurally stiff profiles, such as in particular tubes, profiled beams or planar sheets. Accordingly, it is possible to form a self-supporting chassis with the aid of thin wall panels which are connected to one another and/or to the fastening flange by way of flexurally stiff junctions, as can be seen from FIGS. 2-6. For a weight saving, or for other tasks, one or more of the wall panels may be equipped with one or more cutouts. For an increase in effectiveness, the junctions are additionally stiffened by way of ribs.

The struts 32, 33, 34 may be arranged in skewed fashion with respect to the anchor plate 2. A foot point FP of at least three struts 32, 33, 34 is, in order to realize statically determinate three-point support in the region of support areas, arranged on the outer side 12 of the anchor plate 2 in such a way that the brake actuation loads are dissipated into the anchor plate 2, which is fixed with respect to the vehicle. The formed arrangement of a fastening flange 31 with multiple supports 32, 33, 34 or planar wall panels may jointly form the shape of a regular or irregular polyhedron, which is in particular of tetrahedral or pyramidal form. The described adapter 10 is preferably constructed in one piece from welded steel wire or steel sheet. Sheet can advantageously be three-dimensionally deformed using non-cutting sheet deformation technologies such as, in particular, shear cutting, bending and punching. In conjunction with bending, deep drawing and/or cold working, the additional advantage is achieved that work hardening is automatically realized in deformation zones during the formation of the junctions. Another practical variant consists in the adapter 10 being in the form of a unipartite plastics component that is resistant to high temperatures. Because a cable pull axis, at the point of emergence from the cable pull actuator 3, is coaxial with the axis A2 and runs in each case orthogonally with respect to the fastening flange 31, and the fastening flange 31 is in turn arranged in arbitrarily skewed fashion in relation to the anchor plate 2, each anchor plate 2 has at least one separate, low-friction cable pull guide body 35 with a curved cable pull receptacle 36 comprising a contact surface, which is arranged such that the cable pull 5 is fed in a functionally reliable and loss-free, low-friction, aligned manner in relation to the fastening flange 31, on the one hand, and in relation to the actuation direction B of the actuated brake shoes 6a, 6b, on the other hand.

For this purpose, the cable pull receptacle 36 has a cable pull guide cross section which is at least regionally of U-shaped form and which has at least two mutually oppositely arranged walls (U limbs) of raised form. The separate, and thus easily exchangeable, cable pull guide body 35 is inserted in positively locking fashion, proceeding from the inner side 13 of the anchor plate 2, into a receptacle 39 and is engaged over by a section of the cable pull 5. The diversion of the cable pull gives rise to parasitic pressing forces which fix the cable pull guide body 35 in its receptacle 39. Furthermore, in the cable pull guide body 35, there is advantageously formed a narrow cable pull guide channel, wherein the cable pull 5 is, in order to be secured in position, at least partially engaged over, or engaged around in funnel-shaped, narrowed fashion, by cams as per FIGS. 13 and 14. For an optimization of the characteristics, it is advantageous, in all refinements, for the cable pull guide body 35 to be of a multi-part construction composed of a holding component 40 and of a cable pull guide channel component 41. This makes it possible, in particular, for the cable pull guide channel component 41 to be targetedly formed from a self-lubricating plastics material which has incorporated solid lubricant particles. By means of this design, a constantly expedient and reproducible friction characteristic is ensured over the service life, in order, by way of this contribution, to assist in realizing permanently reproducible control of the cable pull actuator 3 in the improved cable pull guide. By contrast, the holding component 40 may be formed from a sheet steel material.

Figure 17:
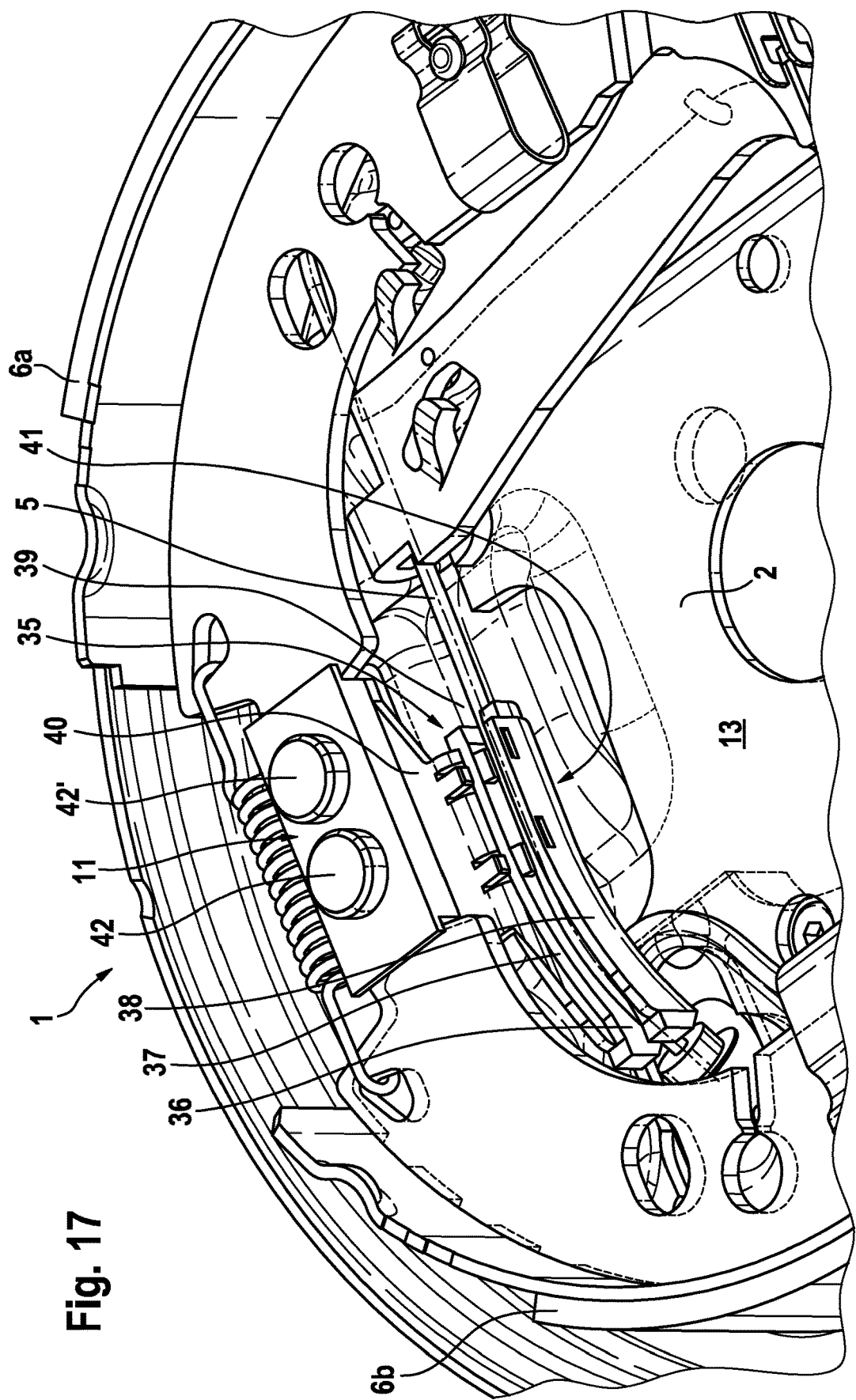
FIG. 17 is a particularly advantageous fastening variant for the cable pull guide body.

FIG. 17 illustrates an indirect, joint fastening of support device 11 and cable pull guide body 35, which is of multi-part form, to the inner side 13 of the anchor plate 2. Fastening means 42 fix the structural unit that is formed.

LIST OF REFERENCE DESIGNATIONS

1 Drum brake module
2 Anchor plate
3 Cable pull actuator
4 Gearing
5 Cable pull
6 Brake pad
7 Motor
8 Gearing housing
9 Spindle arrangement
10 Adapter
11 Support device
12 Outer side
13 Inner side
14 Drive nut
15 Bearing
16 Contact surface
17 Guide
18 Sheath
19 Guide
20 Stop
21 Counterbearing
22 Elastic element
23 Connector
24 Passage opening
25 Outlet opening
26 Seal element
30 Fastening means
31 Fastening flange
32 Strut/wall
33 Strut/wall
34 Strut/wall
35 Cable pull guide body
36 Cable pull receptacle
37 Wall 38 Wall
39 Receptacle
40 Holding component
41 Cable guide channel component
42 Fastening means
A1 Axis
A2 Axis
B Actuation direction
D Axis of rotation
ax axial
r radial
Ü Projecting length
X Spacing
FP Foot point/rest point

The invention claimed is:

1. An electromotively actuated drum brake module with a cable pull actuator arrangement for motor vehicles, comprising:
an electromechanical cable pull actuator which is arranged on an outer side of an anchor plate and which serves for driving a rotation-translation converter for converting a rotational drive input rotary movement into a translational actuation movement of brake pads, which brake pads are arranged on an inner side of the anchor plate in an interior of a brake drum, such that said brake pads can perform an actuation movement in the direction of the brake drum; and
an adapter arranged between the cable pull actuator and the anchor plate,
wherein the adapter comprises a single sheet of material provided in unipartite form and being formed into a frame having multiple planar walls which are arranged at an angle and obliquely with respect to one another, the frame defining a cavity, the frame having, on one side, at least one planar fastening flange for accommodating the cable pull actuator, the frame being fixable at another side to the anchor plate, with the multiple planar walls extending between the fastening flange and the anchor plate.

2. The electromotively actuated drum brake module for motor vehicles as claimed in claim 1, wherein the multiple planar walls are connected to one another and/or to the fastening flange by way of flexurally stiff joints.

3. The electromotively actuated drum brake module for motor vehicles as claimed in claim 2, wherein the multiple planar walls have one or more cutouts.

4. The electromotively actuated drum brake module for motor vehicles as claimed in claim 2, wherein the flexurally stiff joints are stiffened by way of ribs.

5. The electromotively actuated drum brake module for motor vehicles as claimed in claim 2, wherein the fastening flange and the multiple planar walls form a regular or irregular polyhedron.

6. The electromotively actuated drum brake module for motor vehicles as claimed in claim 1, wherein the multiple planar walls are arranged in skewed fashion relative to the anchor plate and are seated on the anchor plate, substantially parallel to an outer side of the anchor plate, by way of at least three support areas or foot points.

7. The electromotively actuated drum brake module for motor vehicles as claimed in claim 1, wherein the adapter is in the form of a sheet-metal molded part or a plastic part.

8. The electromotively actuated drum brake module for motor vehicles as claimed in claim 1, wherein a cable pull axis of a cable at a point of emergence from the cable pull actuator is oriented in an orthogonal direction relative to a plane of the planar fastening flange.

9. The electromotively actuated drum brake module for motor vehicles as claimed in claim 1, wherein the adapter is assigned a separate cable pull guide body with a curved cable pull receptacle which has an at least partially U-shaped guide cross section which has at least two mutually oppositely arranged walls of raised form.

10. The electromotively actuated drum brake module for motor vehicles as claimed in claim 9, wherein the cable pull guide body is inserted in positively locking fashion, proceeding from an inner side of the carrier plate into a receptacle and is engaged over by a section of the cable pull.

11. The electromotively actuated drum brake module for motor vehicles as claimed in claim 10 wherein, the cable pull guide body forms a narrowed cable pull guide channel in which the cable pull is at least partially engaged over or engaged around in funnel-shaped, narrowed fashion.

12. The electromotively actuated drum brake module for motor vehicles as claimed in claim 9, wherein the cable pull guide body is of a multi-part construction composed of a holding component and of a cable pull guide channel component.

13. The electromotively actuated drum brake module for motor vehicles as claimed in claim 9, wherein the cable pull guide body is constructed at least partially from a plastics material comprising at least one incorporated solid lubricant component, and wherein the cable pull guide body is fastened, together with the support device to the anchor plate.

14. The electromotively actuated drum brake module for motor vehicles as claimed in claim 9 wherein, the cable pull guide body forms a narrowed cable pull guide channel in which the cable pull is at least partially engaged over or engaged around in funnel-shaped, narrowed fashion.

* * * * *